United States Patent [19]

Banerjee

[11] Patent Number: 4,551,981
[45] Date of Patent: Nov. 12, 1985

[54] HEAT EXCHANGE METHODS AND APPARATUS

[75] Inventor: Ratan Banerjee, New Brunswick, N.J.

[73] Assignee: The BOC Group, Inc., Montvale, N.J.

[21] Appl. No.: 576,076

[22] Filed: Feb. 1, 1984

Related U.S. Application Data

[62] Division of Ser. No. 265,264, May 20, 1981, Pat. No. 4,444,016.

[51] Int. Cl.⁴ .............................................. F17C 1/18
[52] U.S. Cl. .......................................... 62/70; 62/11; 62/54; 165/1
[58] Field of Search ............. 62/11, 54, 514 R, 68–70; 165/1; 55/88, 89; 220/85 VR, 85 VS

[56] References Cited

U.S. PATENT DOCUMENTS

| | | | |
|---|---|---|---|
| 2,553,557 | 5/1951 | Dunning | 165/1 |
| 2,746,168 | 5/1956 | Rickabaugh | 34/92 |
| 3,266,262 | 8/1966 | Moragne | 62/54 |
| 3,319,434 | 5/1967 | Matesanz | 62/54 |
| 3,672,182 | 6/1972 | Stowasser et al. | 62/70 |
| 3,714,790 | 2/1973 | Battey | 62/54 |
| 4,053,990 | 10/1977 | Bielinski | 34/23 |
| 4,110,091 | 8/1978 | Daeschler et al. | 62/54 |
| 4,150,494 | 4/1979 | Rothchild | 34/28 |
| 4,180,123 | 12/1979 | Dixon | 165/1 |
| 4,237,700 | 12/1980 | Rothchild | 62/514 R |

FOREIGN PATENT DOCUMENTS

2349113 11/1977 France .
1430385 3/1976 United Kingdom .

Primary Examiner—Ronald C. Capossela
Attorney, Agent, or Firm—David L. Rae; Larry R. Cassett; 99

[57] ABSTRACT

A vapor component of a gas mixture is separated by condensation and is recovered for further use. A solvent vapor mixed with inert gas is condensed in a multistage heat exchange system in a manner which utilizes a first refrigerant to condense a portion of the vapor in a first heat exchange device, a second refrigerant, typically cold inert gas, for condensing a further portion of the vapor in a second heat exchanger and a third heat exchange device wherein the liquid phase of the inert gas (i.e. cryogenic liquid) is supplied to provide a source of refrigeration. In this latter heat exchange device, the cryogenic liquid is introduced into a body of condensed vapor thereby chilling such condensed vapor and stirring the same to avoid freezing. Chilled, condensed vapor is removed from the latter heat exchange device and is returned as a reflux thereto to condense the vapor component of the gaseous mixture supplied thereto. A further portion of the chilled, condensed vapor is recirculated to the body of condensed vapor to assist the stirring of this body to avoid freezing of condensed vapor which is collected from the above heat exchange devices and is passed to a suitable storage facility.

11 Claims, 1 Drawing Figure

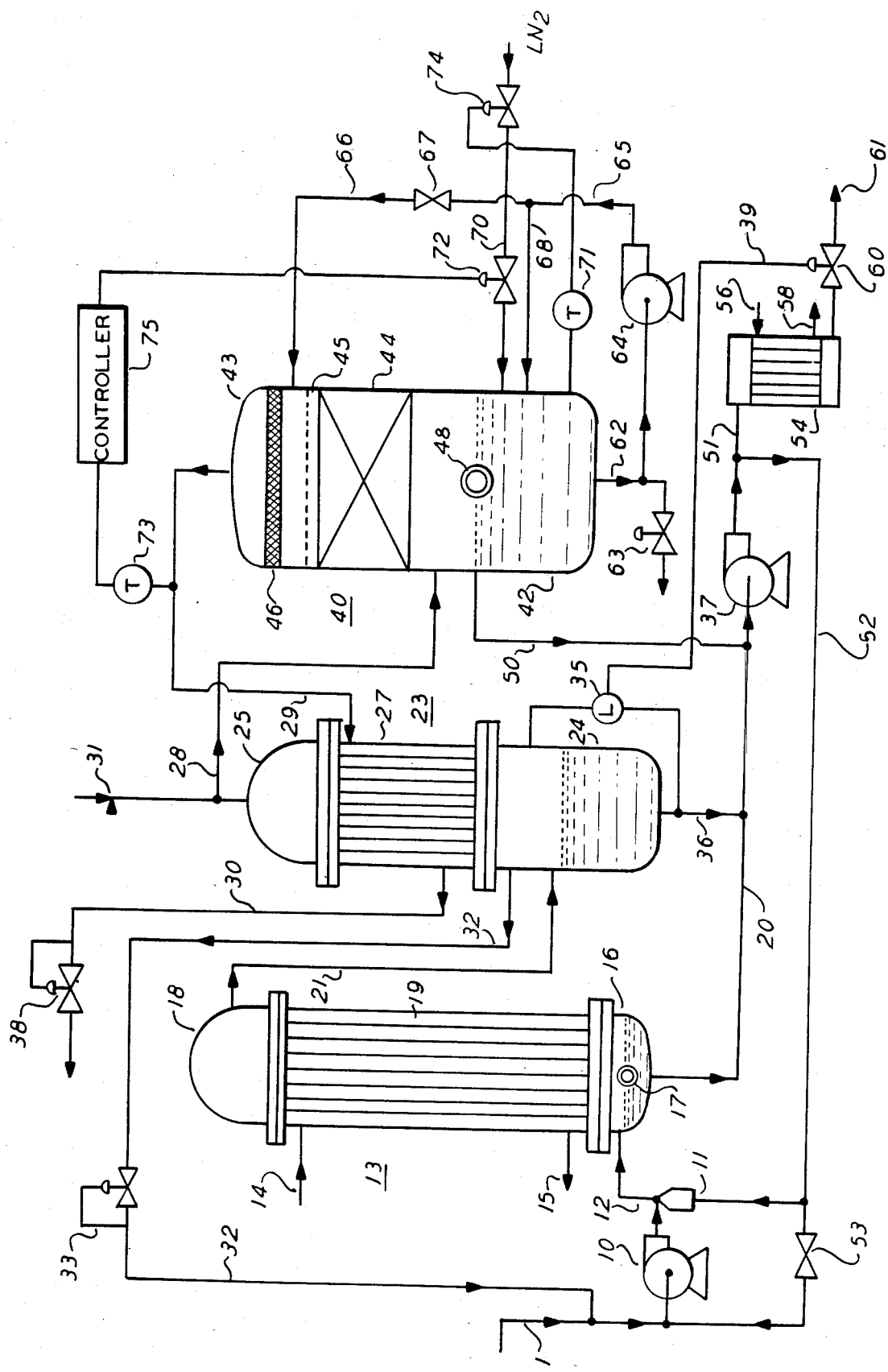

HEAT EXCHANGE METHODS AND APPARATUS

This is a division of application Ser. No. 265,264, filed May 20, 1981, now U.S. Pat. No. 4,444,016.

BACKGROUND OF THE INVENTION

The present invention relates to methods and apparatus for condensing a vapor component of a gas mixture and more particularly to the efficient condensation and recovery of solvent vapor from a gas mixture containing such vapor and inert gas.

During the curing of solvent borne resin coatings in a curing oven, the solvent is evaporated into the oven atmosphere. Traditionally, extremely high air flows were forced through such ovens to limit the solvent vapor partial pressure to values below the lower explosive limit of such vapors in air and to remove such vapors from the oven. These prior art curing processes are objectionable in that large air flows remove excessive amounts of heat from the ovens and consequently high levels of fuel consumption are required to continually supply such heat. In addition, the discharge of hydrocarbon based solvents such as acetone, toluene, etc. to the atmosphere degrade air quality. Although it is possible to incinerate solvents in such discharged air streams, additonal fuel is frequently required in order to sustain combustion and such solvents cannot be recovered for future use.

Various techniques have been proposed to recover solvent vapors from curing ovens or drying chambers such as the methods and apparatus illustrated in U.S. Pat. No. 4,150,494 which is assigned to the assignee of the present invention. In this patent, liquid nitrogen is utilized as a refrigerant for condensing solvent vapor withdrawn from a curing oven or the like with the resulting, vaporized nitrogen being returned to the oven to inert the same. This enables the recovery of condensed, liquid solvent and avoids the discharge of solvent vapor to atmosphere. The total gas flows through the curing oven are diminished and thus, the quantity of fuel necessary to maintain desired oven temperatures is also reduced. This reference also discloses a single pass heat exchange device for condensing solvent vapors against a countercurrent flow of liquid nitrogen and means for sensing the temperature of the condensed solvent so that the flow of liquid nitrogen to the heat exchange means can be controlled to avoid freezing of the solvent. However, the solvent vapor-inert gas mixture withdrawn from the oven atmosphere generally contains a minor component of moisture and it is frequently necessary to subject the solvent vapor to relatively low temperatures, below $-32°$ F. to condense acceptable fractions thereof. Moisture will freeze and tend to clog piping or other conduits utilized to recover condensed solvent when such low temperatures are employed. Although the degree of refrigeration supplied to condense solvent vapor may be reduced upon using lower flows of liquid nitrogen, a corresponding reduction in the solvent fraction actually condensed will result and consequently, the non-condensed gas leaving the heat exchange means will contain an unacceptably high partial pressure of solvent vapor. Typically, it is desired to remove by condensation at least 99% or more of the solvent vapor in the withdrawn oven atmosphere.

In order to facilitate the condensation of solvent vapor withdrawn from curing ovens in an inert gas mixture, it has been proposed to vaporize a cryogenic liquid to form a cold inert gas (i.e. nitrogen) and utilize the refrigeration in such gas to chill by indirect heat exchange the liquid phase of a solvent. The chilled solvent may then be utilized to condense solvent vapor supplied to a suitable heat exchange device as is illustrated in U.S. Pat No. 4,237,700 which is also assigned to the assignee of the present invention. However, this system requires relatively large flows of cold, inert gas through an endless conduit and, consequently, is not a particularly effective means for condensing solvent vapor as these systems are bulky and require considerable floor space in a curing plant or facility. A further proposal for utilizing the refrigeration of a cryogenic liquid to condense solvent vapors is described in French published patent application No. 2,349,113. This reference teaches an indirect heat exchange process wherein liquid nitrogen is utilized to condense vapors emitted from a drying chamber. The use of water cooled heat exchange means alone for the purpose of condensing a solvent vapor from a gas mixture is illustrated in U.S. Pat. No. 2,746,168. However, this system is limited in that intense refrigeration is not available from cooling water and frequently intense refrigeration is required in order to condense a high fraction of solvent vapor, typically 99% or more from a gas mixture. U.S. Pat. No. 4,053,990 describes another heat exchange system for condensing volatile vapors from a gas mixture although the use of cryogenic liquids is not contemplated by this reference.

Although the prior art techniques described above provide various approaches to the problem of condensing a vapor component from a gaseous mixture, none of these approaches is fully satisfactory for condensing virtually all of a solvent vapor from an inert gas mixture which may also contain minor components of moisture. Thus, the above noted prior art does not describe efficient processes or apparatus for condensing virtually all of the solvent vapor in inert gas withdrawn from an oven or drying chamber, etc. at a temperature of approximately 250°–600° F. in a safe, reliable and cost efficient method. Furthermore, prior art systems for recovering solvent have been limited in that variations in flow rates (or tying to multiple ovens) are not readily withstood by such systems. Consequently, for a solvent recovery system to be fully effective, it must be provided with a degree of tolerance toward variations in flows of gas mixtures supplied thereto and yet still efficiently and reliably condense a component from such mixtures. In addition, such systems must be able to condense different solvent vapors existing in various concentrations from inert gas mixtures thereof. Furthermore, condensation of solvent vapor components of a mixture containing moisture must be sustainable at low temperatures (e.g. $-80°$ F. or so) to fully condense such vapor yet avoid the freezing of moisture which will clog pipes or conduits and damage and even destroy pumping devices. The solvent condensed from a gaseous mixture should also be recovered at a temperature suitable for storage, i.e. not excessively hot (over 80° F. or so) or excessively cold. Consequently, the prior art has exhibited a need for methods and apparatus for condensing the vapor component of a gas mixture, typically solvent vapor in inert gas with minor components of moisture in a manner which satisfies the foregoing requirements.

OBJECTS OF THE INVENTION

It is an object of the invention to provide improved methods and apparatus for continuously condensing and separating a vapor component of a gas mixture therefrom.

It is another object of the invention to provide improved methods and apparatus for continuously, efficiently and reliably condensing solvent vapor from a gas mixture comprising inert gas and solvent vapor.

It is a further object of the invention to provide improved methods and apparatus for condensing solvent vapor from a gas mixture also containing moisture without interrupting condensation of solvent vapor by the freezing of such moisture.

It is still another object of the invention to provide improved methods and apparatus for enabling the continuous condensation of any of a plurality of different solvent vapors from gas mixtures of such vapors and inert gas.

It is yet another object of the invention to condense solvent vapor from a gas mixture and recovering condensed solvent at a temperature suitable for storage.

It is another object of the invention to provide improved methods and apparatus for condensing solvent vapor from a gas mixture of varying flow rate and yet condensing virtually all of the solvent vapor from the gas mixture.

Other objects of the invention will become apparent from the following description of exemplary embodiments thereof which follows and the novel features will be particularly pointed out in conjunction with the claims appended thereto.

SUMMARY

In its broadest aspects, the present invention constitutes methods and apparatus for continuously condensing a vapor component of a gas mixture by chilling the liquid phase of the vapor component by direct contact with a cryogenic liquid without significantly freezing the liquid phase and utilizing the chilled liquid phase to condense the vapor component. This condensation is preferably effected in a reflux type heat exchange device. The cryogenic liquid, which may comprise liquid nitrogen, is introduced directly into a body of the liquid phase of the vapor component in the lower reaches of the heat exchange device. The cryogenic liquid is supplied as a stream under positive pressure which is effective to agitate and stir the body of the liquid phase and thereby preclude any significant freezing of this liquid notwithstanding the fact that the cryogenic liquid is up to two hundred degrees (F.) or more cooler than the liquid phase. Thus, the cryogenic liquid both chills and agitates the liquid phase while the cryogenic liquid thereby vaporized upon direct heat exchange with the liquid phase to form cold, inert gas which rises into contact with the gas mixture containing the vapor component to be condensed. This direct contact between the vaporized cryogenic liquid and the vapor component facilitates condensation of the latter as will be subsequently discussed. The liquid phase is continuously withdrawn from the lower reaches of the heat exchange device and is recirculated in the following manner. A first portion of the withdrawn liquid phase is returned to the upper reaches of the heat exchange device as a reflux liquid which, as it descends over a suitable gas-liquid contact medium, contacts the rising gas mixture to condense the vapor component thereof which collects as the body of condensed liquid phase in the lower reaches of the heat exchange device. In addition, a second portion of the withdrawn liquid phase is returned under pressure into the body of the liquid phase in the heat exchange device to augment the agitation and stirring provided by the cryogenic liquid. As the depth of the body of the liquid phase of the vapor component exceeds a predetermined level, the liquid phase passes through an overflow outlet and is collected for storage in suitable facilities.

In order to provide an effective control over the heat exchange operations described above, the partial pressure of the vapor component in the overhead gas exiting the heat exchange device is determined and is utilized to control the flow of cryogenic liquid in the following manner. The partial pressure of the vapor component in the overhead gas will correspond to an equilibrium temperature and consequently, the temperature of this overhead gas is sensed and is maintained at a desired temperature which corresponds to a predetermined partial pressure such as 1 mm Hg. A flow control valve may be adjusted in response to the sensed temperature so as to regulate the flow of cryogenic liquid to the heat exchange device such that this corresponding equilibrium temperature is maintained in the overhead gas. In this manner, efficient use of the cryogenic liquid is maintained while the desired degree of condensation, i.e. reduction of the vapor component of the overhead gas to a predetermined level, is assured. The temperature of the stirred and agitated liquid phase of the vapor component in the lower reaches of the heat exchange device is also sensed and is also utilized to control the flow of cryogenic liquid into the body of the liquid phase to avoid establishing excessively low temperatures therein which could cause freezing of the liquid phase. As a result of stirring and agitating this liquid phase, the average temperature may be readily detected and consequently, cold spots will not occur so as to avoid local freezing of the liquid phase.

In order to obtain full advantage of the refrigeration supplied by the cryogenic liquid to the reflux heat exchange device, the overhead gas removed therefrom is supplied as a refrigerant to a prior heat exchange means to condense a portion of the vapor component of the gas mixture supplied to this prior heat exchange means. The non-condensed gas leaving the prior heat exchange means is the gas mixture which is introduced into the reflux heat exchange device. Preferably, the prior heat exchange means utilizes indirect heat exchange between the cold overhead gas supplied thereto and the gas mixture having the vapor component to be condensed and the warmed gas leaving this heat exchange means may then be utilized for other purposes such as the inerting of a curing oven. An additional heat exchange means which utilizes a refrigerating medium other than a cryogenic liquid, i.e. water, may be utilized to condense a first portion of the vapor component of the gas mixture supplied thereto with the non-condensed portion being supplied to the "prior" heat exchange means to which the non-condensed overhead gas from the reflux heat exchange device is supplied as a refrigerant. This water cooled heat exchange device will operate at the highest temperature, while the heat exchange means receiving the overhead non-condensed gas will operate at an intermediate temperature and the reflux heat exchange device will operate at the lowest temperature. Consequently, the combined condensation of the vapor component in these heat exchange means and device will enable the recovery of 99% or more of the component. The condensed, liquid phase of the vapor component may be collected in a common conduit and passed to a suitable storage facility.

Accordingly, the heat exchange methods and apparatus according to the invention combine the advantages of condensing a vapor component of a gas mixture first against a relatively inexpensive but high temperature refrigerant while also efficiently utilizing a more costly but lower temperature refrigerant medium to fully condense such vapor component in a safe, efficient and reliable manner. It will be appreciated that for relatively heavy vapor components, a major fraction will be condensed in the warm end or the first heat exchange means of the system and relatively little refrigeration need be utilized in the course of condensing the remaining vapor component in the reflux heat exchange device. In this manner, condensation is effected and solvent is recovered in a manner which minimizes the use of cryogenic liquid. However, when the gas mixture contains volatile vapor components, a considerably greater fraction of such vapor will be condensed in the reflux heat exchange device. In this manner, the heat exchange methods and apparatus according to the invention provide considerable flexibility in the recovery of different solvents of varying concentrations in gas mixtures supplied to such apparatus. Consequently, three distinct cooling media are preferably utilized in accordance with the invention in a manner such that each is used most efficaciously to achieve a desired degree of virtually complete condensation and recovery of the vapor component of a gas mixture.

BRIEF DESCRIPTION OF THE DRAWING

The invention will be more clearly understood by reference to the following description of exemplary embodiments thereof in conjunction with the following drawing in which:

The sole FIGURE is a diagrammatic view of heat exchange apparatus for condensing a vapor component of a gaseous mixture in accordance with the invention.

DESCRIPTION OF PREFERRED EMBODIMENT

Referring now to the drawing, illustrated therein is an exemplary embodiment of apparatus for condensing the vapor component of a gas mixture in accordance with the present invention. In order to facilitate a better understanding of the invention, reference will be made to a solvent vapor as the vapor component of the gas mixture. In addition, it will be understood that the gas mixture may comprise solvent vapor, inert gas and a minor component of moisture which is a typical gas mixture withdrawn from a curing oven as illustrated, for example, in U.S. Pat. No. 4,150,494 or from another drying chamber. It will be recognized that the vapor component of other gas mixtures may be condensed by the apparatus illustrated in the drawing and that different solvent vapors such as acetone, toluene, butyl carbytol, etc. may be condensed as well. The vapor component to be condensed must, however, have a boiling point above the boiling point of the cryogenic liquid.

The gas mixture containing solvent vapor is supplied through conduit 1 and is joined by a flow of recycled gas in conduit 32 prior to passage to a blower 10. Preferably, blower 10 will take the form of a commercially available constant volume, positive displacement blower which will be effective to increase the pressure of gas mixtures supplied thereto to about 8.0 p.s.i.g. The outlet of blower 10 is connected to conduit 12 to which a nozzle 11 is connected to supply a spray of the liquid phase of the solvent vapor as will be described in greater detail hereafter. Conduit 12 is connected to the sump area 16 of a shell and tube heat exchange means 13. Tubes 19 are effective to place sump 16 and overhead section 18 in communication with one another while a refrigerant such as cold water is preferably supplied through inlet 14 and removed from outlet 15 of heat exchange means 13. A sight glass 17 may be appropriately disposed in the side of sump 16 in a well known manner to view the level of condensed solvent therein.

Overhead section 18 of heat exchange means 13 is connected by conduit 21 to a gas-liquid separator 24 which is disposed immediately below shell and tube heat exchange means 23. Tubes 27 are effective to communicate with the separator 24 and overhead section 25 in a conventional manner. An outlet in separator 24 is provided so that conduit 32 will communicate with separator 24 and recycle gas through pressure regulator 33 to inlet conduit 1. The shell side of heat exchange means 23 is supplied with a refrigerant, preferably in the form of cold inert gas through conduit 29. This gas exits the shell side as a warmed gas in conduit 30 which may then be utilized for recycle to a curing oven (not shown) and/or for maintaining the oven inerted through a back pressure regulator 38. Preferably, gas in conduit 30 is preheated prior to return to a curing oven. Condensed solvent will collect in the separator 24 of heat exchange means 23 and the level of this solvent will be detected by means of a level sensing means 35 which in turn is coupled to level control valve 60 such that upon detecting a low liquid level in separator 24, valve 60 is closed to avoid loss of liquid supply to pump 37. This pump is effective in known manner to pass solvent which drains into conduit 20 from all three heat exchange means 13, 23 and 40. Finally, the non-condensed overhead gas in overhead section 25 of heat exchange means 23 is removed through conduit 28 which is also provided with safety valve 31.

A reflux heat exchange device 40 is adapted to receive through conduit 28 the overhead, non-condensed gas from heat exchange means 23. Reflux heat exchange device 40 is comprised of a lower section 42 which is preferably provided with a suitable sight glass 48 therein, a gas-liquid contact section 44 and an overhead section 43. An overflow outlet is preferably provided at about the level of sight glass 48 such that upon condensed solvent reaching the level of the overflow outlet, solvent will drain through conduits 50 and 20 and will be supplied to the inlet of liquid pump 37. Gas-liquid contact section 44 may take the form of commercially available contact media or packing such as Raschig rings which are appropriately disposed in the upper reaches of heat exchange device 40. A distributor plate 45 is positioned above gas contact section 44 so that liquid supplied through conduit 66 will flow evenly over contact media in section 44. In addition, a demisting pad 46 is disposed across overhead section 43 so as to preclude the passage of any droplets of condensed vapor upwardly into conduit 29. Pump 37 is effective to supply condensed solvent through line 51 to a heat exchange means 54 and subsequently through valve 60 and line 61 to a suitable storage device. A portion of the condensed solvent supplied through line 51 is bled off and returned through line 52 to a nozzle 11 which is effective to spray condensed solvent into the gas mixture supplied by blower 10 to conduit 12 in a manner to be described in greater detail hereafter. A portion of the liquid in line 52 may be supplied through valve 53 and is then sprayed into the gas supplied to the inlet of blower 10 through conduit 1. Heat exchange means 54 may comprise a conventional water cooled shell and tube heat exchange device having a water inlet 56 and outlet 58. Heat exchange means 54 is provided to assure that condensed solvent is supplied to storage at a suitable temperature and may not be necessary in the event that recovered solvent is supplied to pump 37 at a suitable temperature, i.e. below approximately 80° F. Level sensing means 35 is connected by means of line 39 to control valve 60 which in turn is effective to control the flow of condensed, recovered solvent to storage in response to variations in the level of condensed solvent in separator 24.

Returning now to reflux heat exchange device 40, it will be noted that this device is provided with an outlet line 62 which communicates with lower section 42. An on/off valve 63 is connected to line 62 and may be utilized to drain lower section 42 although valve 63 will normally be maintained in a closed or off condition. Outlet line 62 is connected to the inlet of recirculating pump 64 which in turn is effective to remove condensed solvent in lower section 42 of reflux heat exchange device 40 and supply the same to conduit 65 which is connected to conduits 66 and 68. The recirculating, chilled, condensed solvent supplied through line 66 and valve 67 is utilized as reflux and is introduced into overhead section 43 of heat exchange device 40 with such reflux flowing downwardly through distributor plate 45 and over the contact media of section 44. A further portion of the recirculating, chilled, condensed solvent is supplied through line 68 into lower section 42 of heat exchange device 40 to augment the agitation and stirring action of the cryogenic liquid supplied thereto through line 70 and valve 72. Temperature sensing means 73 is connected through a conventional controller 75 to valve 72 to control the flow of cryogenic liquid, which may comprise liquid nitrogen, liquid argon, etc. in response to the temperature (which corresponds to a predetermined equilibrium partial pressure) of the gas removed from overhead section 43 of heat exchange device 40. A temperature sensing means 71 is also provided to detect the bulk temperature of chilled, condensed solvent in lower section 42 and to supply a signal to valve 74 which is preferably a solenoid valve and which in turn is effective to control the flow rate of cryogenic liquid in response to such sensed temperature. Essentially, the use of temperature sensing means 71 and valve 74 will be effective to preclude excessively low temperatures from being reached in lower section 42 and thus to prevent freezing or solidification of chilled, condensed solvent therein.

The operation of the apparatus illustrated in the drawing will now be described. A gas mixture, typically solvent vapor in inert gas with minor quantities of moisture is supplied through conduit 1 to the inlet of blower 10. Typically, this incoming gas mixture is obtained by withdrawing the inerted atmosphere of a curing oven during the curing of solvent borne resin coatings. This gas mixture is supplied to blower 10 at a temperature of approximately 250°–350° F. The solvent vapor component of this mixture may, for example, comprise a relatively light or volatile material such as acetone or a relatively heavy material such as butyl carbytol. In addition, a recycled flow of gas, which will be predominantly comprised of inert gas is returned through conduit 32 under a pressure established by pressure regulator 33 and joins the gas mixture supplied through conduit 1. The purpose of providing this recycled flow is to maintain a substantially constant pressure at the inlet of blower 10 to assure effective and efficient operation thereof as this blower is preferably a constant volume compression device. Consequently, variations in the flow rate of the gas mixture supplied through conduit 1 will not impair the operation of blower 10, especially when servicing multiple ovens or drying chambers. In addition, liquid solvent may be supplied to blower 10 through valve 53 to clean resin deposits from blower internals and to precool the gas mixture supplied to blower 10.

A spray of liquid solvent is introduced into the gas mixture in conduit 12 by way of nozzle 11. This liquid spray is provided to reduce the average temperature of the gas mixture prior to introduction into heat exchange means 13 and also to saturate this gas mixture so that condensation will occur virtually immediately upon introduction thereof into heat exchange means 13. By so saturating the gas mixture in line 12 with solvent, improved heat transfer is effected in heat exchange means 13 between the refrigerant, typically cold water supplied to the shell side thereof, and the gas mixture such that less heat exchange surface area and consequently a less expensive heat exchange device can be utilized. Also, by cooling the gas mixture, the presence of superheat will be avoided and condensation will occur virtually upon introduction into lower section 16 of heat exchange means 17. Furthermore, as the gas mixture is continuously introduced into lower section 16, a liquid film will continuously flow downwardly on tubes 19 thereby maintaining such tubes clean to preclude fouling of heat transfer surfaces and clogging of passages as a result of potential accumulations of plasticizers or of particulate impurities. The level of condensed solvent in lower section 16 of heat exchange means 13 will be controlled by the level of solvent in separator 24 due to a common connection to conduit 20. Typically, with regard to heavy aromatic solvents such as Solvesso 150 (available from Exxon Corporation), up to 80% of the solvent vapor in the gas mixture supplied to heat exchange means 13 is condensed therein. When the incoming gas mixture supplied through conduit 12 contains relatively light solvents such as acetone, up to 35% or less of such solvent is typically condensed. The incoming gas mixture is supplied through conduit 12 to lower section 16 typically at a temperature of about 150° F. or so. Cooling water which may be supplied through conduit 14 at a temperature of between 55°–85° F. will be removed from heat exchange means 13 in conduit 15 typically at a temperature of about 110° F. The condensed solvent collecting in lower section 16 and draining there-from into conduit 20 will typically exhibit a temperature of 120°–150° F. while the non-condensed gas removed from overhead section 18 of heat exchange means 13 will be at a temperature of approximately 65°–95° F. depending on the cooling water inlet temperature.

The solvent vapor containing gas mixture is supplied through conduit 21 into separator 24 wherein a liquid-gas separation is effected. In addition, the gas mixture supplied through conduit 21 undergoes an expansion upon introduction into separator 24. This expansion is effective to both reduce the velocity of the gas flow to a level well below the critical velocity and to separate any entrained droplets of condensed solvent which may be carried with the gas mixture supplied through line 21. A cold, relatively solvent free gas is supplied through conduit 29 to the shell side of heat exchange means 23 such that the gas mixture rising from separator 24 will undergo countercurrent indirect heat exchange with this cold, solvent free gas which is typically supplied at a temperature of between about $-70°$ to $+15°$ F. In this manner, the solvent condensed on tubes 27 will operate as a reflux liquid and will maintain these tubes free of any residual solid impurities or plasticizers which may be carried into separator 24 by the incoming gas mixture. The gas leaving overhead section 25 of heat exchange means 23 through line 28 will typically have most of the solvent vapor removed therefrom by condensation and such gas will exhibit a temperature of approximately $20°-60°$ F. which will be similar to the temperature of condensed solvent collected in separator 24. Condensed solvent drains from separator 24 through conduit 36 into conduit 20 which in turn is effective to supply such condensed solvent to the inlet of pump 37. The level of condensed solvent in separator 24 is sensed by level sensing means 35 which in turn is effective to modulate level control valve 60 through conventional control devices (not shown). That is, in the event that an increased flow of the gas mixture is supplied through conduit 1 and solvent is then condensed at a greater rate in heat exchange means 13, 23 and 40, the level of condensed solvent in separator 24 will rise. This level will be sensed and upon such an increase, an appropriate electrical or other control signal will be supplied to control valve 60 to increase the flow rate of liquid solvent pumped by pump 37 and thus reduce the level of condensed liquid solvent in separator 24. Consequently, the flooding of tubes 19 and 27 which would thereby impair the ability of heat exchange means 13 and 23 to condense solvent will be avoided. A safety valve 31 is coupled to line 28 and is set to open upon a predetermined, maximum pressure existing in the overall heat exchange system, thereby limiting the pressure therein to safe levels. The warmed, virtually inert gas which is removed from the shell side of heat exchange means 23 through line 30 may be utilized to inert a curing oven or may be employed for other purposes. It will be appreciated that most of the moisture carried into heat exchange means 13 and 23 will condense along with solvent vapor condensation and only a minor portion of such moisture will be supplied through outlet 28 to reflux heat exchange device 40, the operation of which will now be described.

As mentioned previously reflux heat exchange device 40 is effective to condense solvent vapor supplied thereto through line 28 by the use of a cryogenic liquid in a manner which efficiently utilizes the refrigeration available in this liquid but without freezing or solidifying solvent vapor and thereby enable essentially continuous condensation of such vapor. A flow of cryogenic liquid such as liquid nitrogen, is supplied through conduit 70 and valves 72 and 74 therein and is introduced into lower section 42 of reflux heat exchange device 40 under a positive pressure so as to stir and agitate condensed solvent and thereby avoid freezing thereof. The cryogenic liquid can chill the body of condensed solvent, typically to a temperature of as low as $-100°$ F., which will result in the vaporization of the supplied cryogenic liquid. When liquid nitrogen is utilized, the same is typically supplied at a temperature of $-320°$ F., and vaporization results in the formation of cold, inert gas which rises upwardly through condensed solvent in lower section 42 and assists in the condensation of solvent vapor in the gas mixture supplied through conduit 28 into reflux heat exchange device 40. The chilled, condensed solvent is continuously removed from lower section 42 through outlet 62 by means of pump 64 which recirculates a portion of such chilled solvent through line 65 and line 68 into the condensed solvent in lower section 42 to assist in stirring and agitating the same thereby avoiding freezing of solvent as mentioned above. A further portion of recirculated, chilled solvent is supplied through valve 67 in line 66 and is introduced into overhead section 43 as reflux liquid which flows downwardly through distributor plate 45 and the contact media in section 44. This cold reflux liquid, which is typically at a temperature of about $+10°$ to $-85°$ F., will be effective to condense solvent vapor rising through the contact media and the condensed solvent is collected in lower section 42. The level of this solvent may be visually determined through sight glass 48. Upon the level of solvent in lower section 42 reaching the level of an overflow outlet, condensed solvent is passed through conduit 50 to pump 37. Any trace moisture entering heat exchange device 40 will tend to freeze in and float on the liquid phase in section 42 and will be carried away through the overflow outlet to conduit 50. This recovered condensed solvent is mixed with liquid solvent collected from heat exchange means 13 and separator 24 and passed through heat exchange means 54 to reduce the temperature thereof to a predetermined level. It will be understood that in the event most of the solvent vapor is condensed in heat exchange means 13, this condensed solvent may exhibit an average temperature of over 80° F. and for this reason may not be suitable for storage. Thus, heat exchange means 54 will be effective through the use of cooling water or other suitable refrigerant supplied through inlet 56 and recovered at outlet 58 to reduce the temperature of such solvent to a predetermined level suitable for storage.

In order to assure that virtually all of the solvent vapor supplied to reflux heat exchange device 40 is, in fact, condensed therein, the partial pressure of solvent vapor in the overhead gas leaving device 40 through conduit 29 is maintained at a predetermined low level. This is accomplished by maintain-ing the temperature of this overhead gas at an equilibrium temperature which corresponds to this low partial pressure. Thus, temperature sensing means 73 supplies a signal to controller 75 which in turn controls the setting of control valve 72. Typically, a partial pressure of solvent vapor in line 29 of 1 mm Hg will correspond to an equilibrium temperature which is maintained in device 40 in the following manner. In the event that the gas mixture supplied through conduit 28 is at a higher than expected temperature, the refrigeration provided in device 40 to condense such vapor will not be sufficient to establish a temperature therein which is the equilibrium temperature corresponding to a partial pressure of solvent vapor in the overhead gas exiting overhead section 43 such as 1 mm Hg or other predetermined value. Consequently, upon detecting a higher temperature of the overhead gas removed through conduit 29, sensing means 73 will supply a signal representative of such higher temperature, and hence partial pressure, to controller 75 which is effective to compare this signal with a predetermined temperature corresponding to a desired partial pressure. The result of this comparison is supplied to control valve 72 to cause this valve to open farther and thereby increase the flow rate of cryogenic liquid into reflux heat exchange device 40. This increased flow of cryogenic liquid will be effective to reduce the average temperature of condensed solvent in lower section 42 and consequently, reflux liquid will be supplied through conduit 66 to overhead section 43 at a reduced temperature. By so providing a colder reflux liquid, a lower temperature will be established in heat exchange device 40 which in turn will cause a greater condensation of solvent vapor and thereby minimize the difference between the actual solvent vapor partial pressure of the overhead gas and the predetermined partial pressure, e.g. 1 mm Hg or other desired value. In this manner, the refrigeration which is actually required to establish a desired degree of condensation of solvent vapor (which is reflected by the partial pressure of solvent vapor in the overhead, non-condensed gas in conduit 29) will in fact be consumed and consequently, efficient use is made of the cryogenic liquid supplied through conduit 70 to reflux heat exchange device 40. It will be understood that in the event most (about 90% or so) of the solvent vapor of the incoming gas mixture in conduit 1 is condensed in heat exchange means 13 and 23, and thus a relatively minor portion of such solvent vapor need be condensed in reflux heat exchange device 40, the flow of cryo-genic liquid in line 70 may be accurately controlled to condense virtually all of the solvent vapor supplied through conduit 28 without utilizing excessive quantities of the cryogenic liquid.

Temperature sensing means 71 is effective to sense the temperature of condensed solvent in a central location within lower portion 42 so that an actual, average temperature of such condensed solvent is measured and is utilized to control the opening and closing of valve 74. This precludes the introduction of cryogenic liquid at flow rates which would cause freezing of the condensed solvent. It will be appreciated that although the temperature of condensed, chilled solvent in lower section 42 may be as low as −100° F., any moisture which may be introduced into reflux heat exchange device 40 through conduit 28, and which may freeze, will float to the surface of such condensed, chilled solvent and will be carried out through the overflow outlet into conduit 50. However, in the event that moisture above a desired or predetermined level is present in the gas mixture supplied through conduit 28, other means such as driers of the molecular sieve type may be utilized to preclude the entry of excessive moisture into reflux heat exchange device 40.

In accordance with the invention, additional sensing and control devices may be utilized to avoid undesired conditions from prevailing in various sections of the aforedescribed apparatus. For example, in the event cooling water, normally supplied through conduit 14 to heat exchange means 13, is lost for some unexpected reason, an appropriate sensing device may be utilized to terminate operation of blower 10 to avoid the supply of solvent vapor containing gas mixtures to heat exchange means 13 when the same is not conditioned to effectively condense a portion of such solvent vapor. Similarly, operation of blower 10 may be terminated upon detecting an unduly high temperature of the non-condensed gas supplied through conduit 21 to heat exchange means 23 thereby avoiding an overload condition. Furthermore, in the event that valve 74 in cryogenic liquid supply line 70 were to stick in an open position, a suitable alarm device may be actuated to indicate that such an abnormal condition has occurred thereby allowing an operator to take the necessary corrective action.

Although operation of the apparatus according to the invention has been described in a substantially steady state condition, the apparatus is started up in accordance with the following procedure. Initially, liquid solvent is supplied to reflux heat exchange device 40 to essentially prime the same and is supplied to heat exchange means 13 and separator 24 to establish a liquid seal in conduit 20. Cryogenic liquid is then introduced into lower section 42 and is continuously recirculated through conduits 65 and 68 by means of pump 64 while valve 67 in reflux line 66 remains closed. When temperature sensing means 71 detects a temperature corresponding to a predetermined, low partial pressure of solvent vapor to be condensed, e.g. 1 mm Hg, which typically is a temperature between −70° and +15° F., the flow of incoming gas to blower 10 may be commenced and condensation will begin in heat exchange means 13 and 23, the former being supplied with a refrigerant such as cooling water as mentioned above. At this point, gas will be admitted into reflux heat exchange device 40 and valve 67 will be opened to commence a reflux flow through line 66 which in turn will continuously condense solvent in the vapor supplied to heat exchange device 40. Thus, commencement of operation of the apparatus according to the invention will occur only after reflux heat exchange device 40 is cooled to a preferred, operating temperature so as to avoid the supply of solvent vapor containing gases thereto under conditions such that incomplete condensation could occur.

The foregoing and other various changes in form and details may be made without departing from the spirit and scope of the present invention. Consequently, it is intended that the appended claims be interpreted as including all such changes and modifications.

What is claimed is:

1. A method of continuously condensing a vapor component of a gas mixture supplied to a reflux heat exchange device containing a body of the liquid phase of said vapor component comprising the steps of:
   introducing a flow of a cryogenic liquid, having a boiling point below the boiling point of said vapor component, directly into said liquid phase body thereby chilling said liquid phase and stirring the same to substantially preclude freezing of said liquid phase; and
   removing said chilled liquid phase from said device and returning said removed chilled liquid phase as reflux to said device and into contact with said gas mixture to thereby condense said vapor component.

2. The method defined in claim 1 wherein said cryogenic liquid is vaporized upon introduction to said liquid phase to form a cold gas which rises in said device into contact with said gas mixture to promote additional condensation of said vapor component.

3. The method defined in claim 1 additionally comprising the step of recirculating a portion of said removed, chilled liquid phase into said body of said liquid phase to augment stirring of said body.

4. The method defined in claim 1 additionally comprising the steps of discharging an overhead gas stream from said reflux heat exchange device; sensing the temperature of said discharged gas stream; comparing the temperature of said discharged gas stream with a temperature corresponding to a predetermined equilibrium partial pressure of said vapor component; and controlling the flow rate of said cryogenic liquid stream into said device to establish a chilled, reflux liquid temperature which effects condensation of said vapor to an extent such that the difference between the temperature of said discharged gas stream and said temperature corresponding to said equilibrium partial pressure is minimized.

5. The method defined in claim 4 additionally comprising the steps of supplying said discharged gas stream as a refrigerating medium to a further heat exchange device; and supplying a gas mixture having a greater concentration of said vapor component than in the gas mixture supplied to said reflux heat exchange device to said further heat exchange device to condense at least a portion of said vapor component from the gas mixture supplied to said further heat exchange device.

6. The method defined in claim 5 wherein gas which is not condensed in said second heat exchange device is supplied to said reflux heat exchange device as said gas mixture.

7. The method defined in claim 5 additionally comprising the steps of removing a further flow of said condensed, chilled liquid phase from said reflux heat exchange device; and removing a flow of said condensed vapor component from said further heat exchange device; combining said flows; and pumping said combined flow to a suitable storage device.

8. The method defined in claim 7 additionally comprising the steps of sensing the level of said condensed vapor component in said further heat exchange device; and controlling the rate of pumping said combined flow to said storage device to maintain said liquid level within a predetermined range.

9. The method defined in claim 8 additionally comprising the step of spraying a portion of said pumped combined flow into said gas mixture prior to introducing said gas mixture into said further heat exchange device to cool said gas mixture and to increase the concentration of said vapor component to approximately saturation.

10. The method defined in claim 1 wherein said gas mixture is comprised of a solvent vapor, the vapor phase of said cryogenic liquid and a minor concentration of moisture.

11. The method defined in claim 1 wherein the step of returning reflux liquid phase to said heat exchange device comprises passing said reflux downwardly over a gas-liquid contact medium countercurrent to a flow of said gas mixture upwardly therethrough whereby said vapor component is condensed upon contact with said reflux liquid phase.

* * * * *